United States Patent
Phillips et al.

(10) Patent No.: US 6,721,555 B1
(45) Date of Patent: Apr. 13, 2004

(54) SYSTEM AND METHOD FOR FACILITATING DEVICE AUTHENTICATION IN A WIRELESS COMMUNICATIONS SYSTEM

(75) Inventors: Marc S. Phillips, San Diego, CA (US); Marcello Lioy, San Diego, CA (US); Raymond Tah-Shen Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/507,258

(22) Filed: Feb. 18, 2000

Related U.S. Application Data (60) Provisional application No. 60/120,803, filed on Feb. 19, 1999.

(51) Int. Cl.[7] .................................................. H04M 1/66
(52) U.S. Cl. ........................ 455/411; 370/335; 370/465
(58) Field of Search ................................. 455/410, 411, 455/435, 415; 380/247–249; 370/335, 465

(56) References Cited

U.S. PATENT DOCUMENTS

| | | | | | |
|---|---|---|---|---|---|
| 5,455,865 A | * | 10/1995 | Perlman | ...................... | 713/153 |
| 5,970,059 A | * | 10/1999 | Ahopelto et al. | ........... | 370/338 |
| 5,978,386 A | * | 11/1999 | Hamalainen et al. | ....... | 370/338 |
| 6,041,054 A | * | 3/2000 | Westberg | ..................... | 370/389 |
| 6,111,866 A | * | 8/2000 | Kweon et al. | .............. | 370/335 |
| 6,230,002 B1 | * | 5/2001 | Floden et al. | .............. | 455/411 |
| 6,230,012 B1 | * | 5/2001 | Willkie et al. | .............. | 455/435 |
| 6,278,706 B1 | * | 8/2001 | Gibbs et al. | ................ | 370/352 |
| 6,320,873 B1 | * | 11/2001 | Nevo et al. | ................. | 370/335 |
| 2001/0038626 A1 | * | 4/2001 | Dynarski et al. | ........... | 370/356 |
| 2002/0049059 A1 | * | 5/2002 | Soininen et al. | ............ | 455/439 |
| 2002/0052204 A1 | * | 5/2002 | Bender et al. | .............. | 455/450 |
| 2002/0057673 A1 | * | 5/2002 | Melen | ........................ | 370/352 |

FOREIGN PATENT DOCUMENTS

EP       494576     *   7/1992

\* cited by examiner

*Primary Examiner*—Vivian Chin
*Assistant Examiner*—Sujatha Sharma
(74) *Attorney, Agent, or Firm*—Philip R. Wadsworth; Charles D. Brown; Howard H. Seo (57) ABSTRACT

A system for efficiently accommodating an authentication protocol in a communications system. The system includes a first mechanism for establishing a first communications interface between a first device and a second device and for establishing a second communications interface between the second device and a third device. A second mechanism selectively relays authentication signals received by the second device between the first device and the third device. A third mechanism employs the third device and the second mechanism to authenticate the first device via the first communications link and the second communications link.

22 Claims, 4 Drawing Sheets

SYSTEM AND METHOD FOR FACILITATING DEVICE AUTHENTICATION IN A WIRELESS COMMUNICATIONS SYSTEM

This application claims the benefit of Provisional application No. 60/120,803, filed Feb. 19, 1999.

BACKGROUND OF THE INVENTION

1. Field of Invention

This invention relates to communications systems. Specifically, the present invention relates to systems and methods for handling and supporting authentication protocols in a wireless communications network.

2. Description of the Related Art

Wireless communications are increasingly employed in a variety of demanding applications including Internet and local area network applications. Such applications demand wireless communications systems that efficiently accommodate various network protocols while affording users maximum security and privacy.

Laptops and other mobile computing devices often employ wireless phones and associated wireless communications networks to access the Internet and other data networks and application servers. Browser functionality required to access the Internet is often built into the mobile computing device, wireless phone, or other wireless computing device.

The wireless phone (Mobile Terminal (MT2)) and any accompanying electronic devices (Terminal Equipment (TE2)) are collectively called the mobile station. The interface between the wireless phone transceiver (Mobile Station Modem (MSM)) and an accompanying TE2 device is called the $R_m$ interface. In mobile stations not employing separate TE2 devices, the communications interface between the MSM and any browser functionality built into the wireless phone is also called the $R_m$ interface. The wireless communications interface between the wireless phone and associated wireless network infrastructure is called the $U_m$ interface.

A wireless communications system, such as a Code Division Multiple Access system (CDMA), typically includes a plurality of mobile stations (e.g. wireless phones, palmtop or laptop computers connected to wireless modems, and so on) in communication with one or more base stations or base station transceiver subsystems (BTS), also called cell sites.

A base station and/or BTS facilitates call routing among mobile stations and between mobile stations and a Mobile Switching Center (MSC). The MSC facilitates call routing between base stations or BTS's and other communications devices that are connected to the Public Switched Telephone Network (PSTN), also called the landline network. The MSC may also facilitate call routing between base stations and/or BTS's and the Internet via an Interworking Function (IWF). The IWF is often co-located with the MSC. The communications interface between the IWF and the MSC is called the L interface. The L interface is often designed in accordance with the IS-707 telecommunications industry standard. The IWF typically includes a router that routes calls between the IWF and the Internet via Quick Net Connect (QNC) methods.

Additional details of a wireless CDMA communications system are discussed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated herein by reference. BTS architecture is discussed more fully in U.S. Pat. No. 5,654,979, entitled "CELL SITE DEMODULATION ARCHITECTURE FOR A SPREAD SPECTRUM MULTIPLE ACCESS COMMUNICATIONS SYSTEM", assigned to the assignee of the present invention and incorporated herein by reference.

CDMA communications systems are often built in accordance with the IS-95 telecommunications industry standard. In IS-95 systems, data is transmitted between a BTS and a mobile station in digitally encoded frames. For data services calls, the Radio Link Protocol (RLP) is used to transmit data packets inside of the IS-95 frames. RLP is, in turn, used to transmit PPP packets. PPP is the data link layer protocol that is used for IS-95 data services. PPP packets are encoded in High Level Data Link Control (HDLC) frames for transmission over the $R_m$, $U_m$ and L interfaces. Use of PPP packets with HDLC frames is discussed more fully in Request For Comment (RFC) 1662, entitled PPP IN HDLC LIKE FRAMING, published in July 1994.

The telecommunications industry standard IS-707 details the behavior of data transmission between TE2 devices and an IWF. The IS-707 standard introduces a Network Model that specifies protocol requirements for the $R_m$, $U_m$, and L interfaces. In accordance with the Network Model, one Point-to-Point Protocol ($PPP_R$) link is established on the $R_m$ interface between the MT2 device and associated TE2 device, while a separate PPP link ($PPP_U$) link is established on the $U_m$ and L interfaces between the MT2 device and the IWF.

PPP provides a standard method for transporting multi-protocol datagrams over point-to-point links. PPP specifies methods for encapsulating multi-protocol datagrams and includes a Link Control Protocol (LCP) for establishing, configuring, and testing the data-link connection. PPP also includes various Network Control Protocols (NCP's) for establishing and configuring various network-layer protocols. PPP is more fully discussed in Request For Comment (RFC) 1661, entitled THE POINT-TO-POINT PROTOCOL, published in July 1994.

When a mobile station travels between wireless communications systems or between base station coverage areas, the mobile station is handed off from the first system to the target system. If the target system is associated with a different IWF, then the $U_m$ link is renegotiated. In this case, the link between the mobile station and the first wireless communications system is eventually dropped and a new $U_m$ link is established between the mobile station and the target wireless communications system. In a network model call, $U_m$ and $R_m$ links are isolated so that handoffs and other $U_m$ link renegotiations are transparent to the $R_m$ link.

To provide such isolation, PPP stack on the wireless phone, i.e., MT2 device, typically unframes and reframes PPP configuration packets received over the $U_m$ and $R_m$ links. The PPP configuration packets specify configuration options for the $R_m$ and $U_m$ interfaces. Unfortunately, existing MT2 devices typically unnecessarily unframe, process, and reframe all PPP packets, and hence, some PPP packets are unnecessarily unframed, processed, and reframed. This may reduce data throughput over the $R_m$ and $U_m$ links, increase MT2 device power consumption, decrease device battery life, and require additional MT2 device processing resources.

Users of wireless communications devices, such as laptops connected to wireless modems, often subscribe to one or more networks services, such as Internet access, via an Internet Service Provider (ISP). Users and associated service providers often demand secure and private communications between users and the service providers. Accordingly, wireless communications networks demand efficient systems and methods to validate, i.e., authenticate users before granting access to a data network, such as the Internet. Unfortunately, existing wireless CDMA communications networks typically lack efficient systems and methods for reliably authenticating the user of a TE2 device or the TE2 device itself.

Hence, a need exists in the art for an efficient system and method for facilitating secure and private communications between a TE2 device and a communications network. There is a further need for a system and method for efficiently authenticating TE2 devices.

SUMMARY OF THE INVENTION

The need in the art is addressed by the system for efficiently accommodating an authentication protocol in a communications system of the present invention. In the illustrative embodiment, the inventive system adapted for use with Point-to-Point Protocol (PPP) and Challenge Handshake Authentication Protocol (CHAP) in a Code Division Multiple Access (CDMA) wireless communications system. The system includes a first mechanism for establishing a first communications interface ($R_m$ interface) between a first device (TE2 device) and a second device (MT2 device) and for establishing a second communications interface ($U_m$ interface) between the second device and a third device (BS/MSC/IWF). A second mechanism selectively relays authentication signals received by the second device between the first device and the third device. A third mechanism employs the third device and the second mechanism to authenticate the first device via the first communications link and the second communications link.

In a specific embodiment, the third mechanism further includes a fourth mechanism for selectively processing configuration signals received by the second device over the second interface. The first interface and the second interface are point-to-point protocol (PPP) interfaces. The first interface is a $U_m$ interface, and the second interface is an $R_m$ interface.

The second mechanism includes CHAP. The communications system includes a wireless CDMA communications system. The first device includes a TE2 device and the second device includes an MT2 device. The third device includes a base station, a Base Station Transceiver Subsystem (BTS), and/or a Mobile Switching Center (MSC) in communication with an Interworking Function (IWF). The $U_m$ interface includes a wireless interface between the MT2 device and the base station, BTS, or MSC of the wireless communications system.

In a more specific embodiment, the MT2 device includes a wireless phone. The TE2 device includes a computer, such as a laptop computer. The first mechanism includes standard Point-to-Point Protocol (PPP) stacks on the third device and the first device, and modified PPP stacks on the second device. The second mechanism includes a fifth mechanism for analyzing packets received by the second device to ascertain if the packets are CHAP packets and providing a first signal in response thereto. A sixth mechanism selectively relays packets in response to the first signal. The third mechanism includes CHAP installed on the third mechanism and the first mechanism.

The novel design of the present invention is facilitated by the second mechanism, which selectively relays authentication signals and other signals not requiring IS-707 network model processing via the second device through to the first device and/or third device. This represents an unobvious alteration that yields significant advantages. Namely, the second device does not require provisioning with authentication secrets and usernames, and facilitates authenticating the first device via the third device. By avoiding provisioning the second device with shared secrets and user names, improvements in network security and efficiency are achieved as discussed more fully below. Furthermore, by avoiding unnecessary processing of CHAP on the second device, communications system throughput is enhanced and processing resources are conserved.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
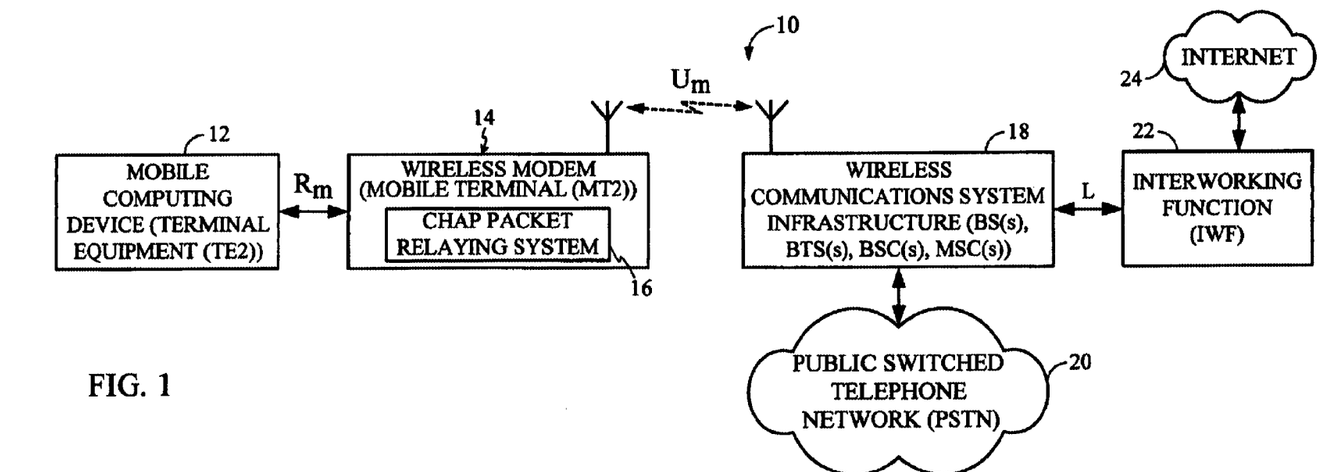
FIG. 1 is a diagram of a communications system constructed in accordance with the teachings of the present invention and adapted for use with the IS-707 network model.

FIG. 1 is a diagram of a communications system 10 constructed in accordance with the teachings of the present invention and adapted for use with the IS-707 network model. For clarity, various details have been omitted from FIG. 1, however, with reference to the present teachings, one skilled in the art may readily recognize and implement additional requisite components without undue experimentation.

The system 10 includes a mobile computing device (Terminal Equipment (TE2 device)) 12, such as a laptop or palm top computer. The TE2 device 12 is connected to a wireless modem (Mobile Terminal (MT2 device)) 14, such as a wireless phone, via an $R_m$ interface. The MT2 device 14 includes a CHAP packet relaying system 16. The MT2 device 14 is connected to wireless communications system infrastructure 18 via a wireless $U_m$ interface. The infrastructure 18 may include Base Stations (BS's), Base Station Transceiver Subsystems (BTS's), Base Station Controllers (BSC's), Mobile Switching Centers (MSC's), and other wireless communications system infrastructure components. The infrastructure 18 is connected to the Public Switched Telephone Network (PSTN) 20. The infrastructure 18 is also connected to an Interworking Function (IWF) 22 that is connected to the Internet 24. The IWF 22 includes one or more routers and modem pools (not shown) for routing calls between the wireless infrastructure 18 and the Internet 24.

In accordance with the IS-707 network model, the MT2 device 14 includes two $PPP_{MT2}$ stacks (not shown), one for each of the $R_m$ and $U_m$ interfaces; the TE2 device 12 includes a $PPP_{TE2}$ stack for the $R_m$ interface; and the IWF includes a $PPP_{IWF}$ stack for the L and $U_m$ interfaces.

In operation, the user of the TE2 device 12 and MT2 device 14 places a call through the MT2 device 14 to a different communications device (not shown), such as an application server connected to the PSTN 20, or to an Internet Service Provider (ISP) (not shown) associated with the IWF 22 and the Internet 24. For the purposes of the present discussion, the MT2 device 14 is a wireless phone, and the TE2 device 12 is a laptop computer.

When the call is placed, a $PPP_{Um,L}$ communications link is established between the MT2 device 14 and the IWF 22 via the $PPP_{IWF}$ and $PPP_{MT2}$ protocol stacks. A second $PPP_{Rm}$ link is established between the MT2 device 14 and the TE2 device 12 via the $PPP_{TE2}$ and $PPP_{MT2}$ protocol stacks.

PPP supports the Challenge Handshake Authentication (CHAP) protocol, which is designed for inclusion in PPP stacks. Authentication protocols are often employed to verify that users attempting to access a particular service are authorized users. For an example, the IWF 22 may wish to verify that the user of the TE2 device 12 is an authorized user of Internet access service offered via the IWF 22.

CHAP is often employed to improve the security of the communications link between two communications devices employing PPP protocols. CHAP is included in most PPP implementations and so is expected to be found in the PPP stacks on the communications devices. PPP also defines an extensible Link Control Protocol, which allows negotiation of an authentication protocol for allowing an authenticator to authenticate a peer before allowing network layer protocols to transmit over the link.

The authenticator is generally defined as the end of the link requiring the authentication. The authenticator indicates the employed authentication protocol via a Configure-Request message sent during a PPP link establishment phase. The end of the point-to-point link that is being authenticated by the authenticator is called the peer.

A CHAP authenticator sends a random challenge to a peer. The peer responds with a hashed response based on the challenge and a shared secret. To establish communications over a PPP link, each end of the PPP link sends LCP packets to configure the link during the PPP link establishment phase. An authentication phase follows the establishment of the PPP link. A network-layer protocol phase follows the authentication phase.

If authentication of the link is desired, a PPP implementation must specify the authentication-protocol configuration option during the PPP link establishment phase. CHAP periodically verifies the identity of the peer using a 3-way handshake upon initial link establishment and at random times during the establishment of the link.

After the link establishment phase is complete, the authenticator may send a challenge message to the peer. The peer responds with a value calculated using a one-way hash function. The authenticator checks the response against its own calculation of the expected hash value. If the values match, the authentication is acknowledged. Otherwise, the connection is terminated. At random intervals, the authenticator may send a new challenge to the peer, repeating the above steps.

Figure 3:
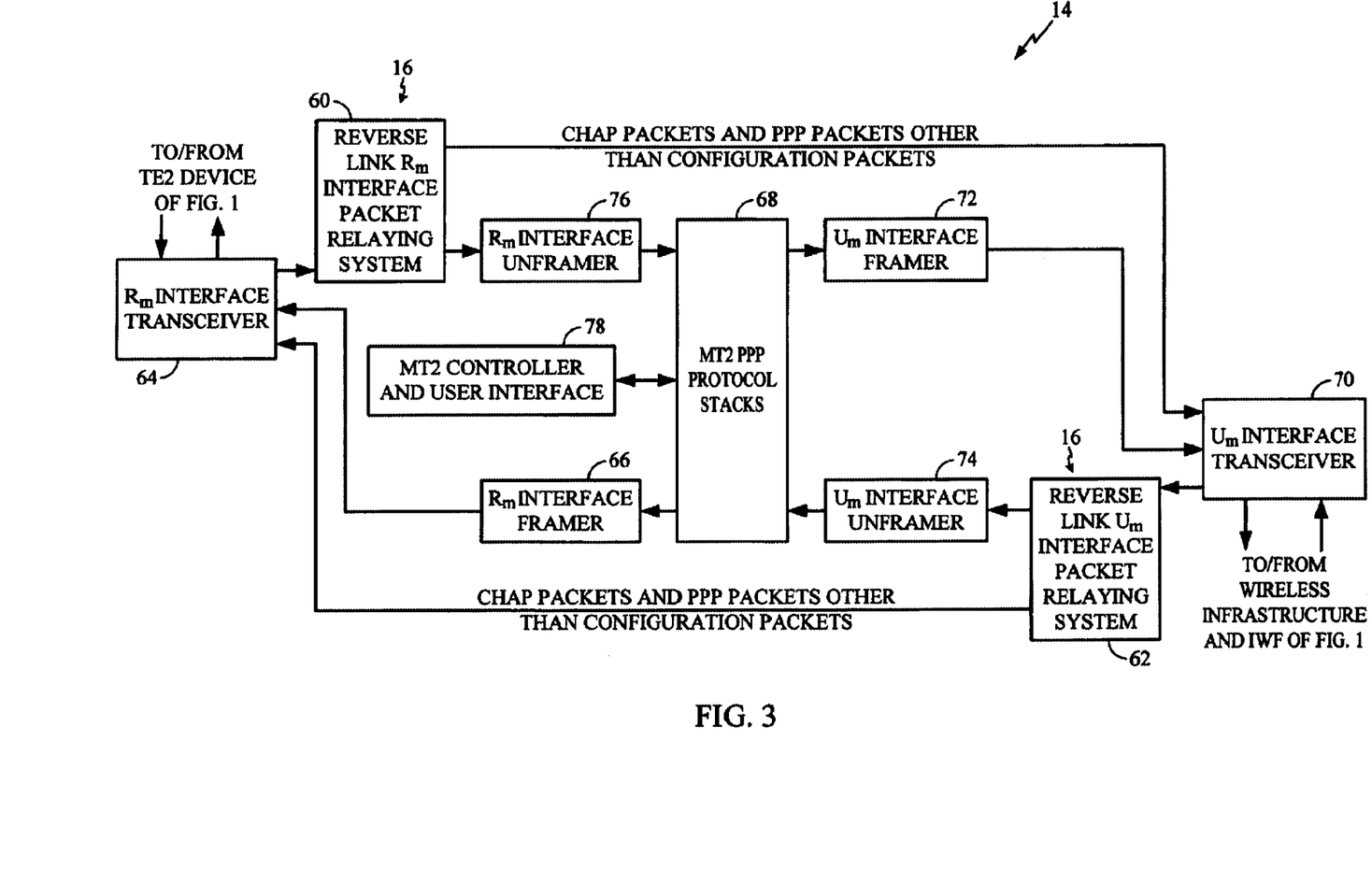
FIG. 3 is a more detailed diagram of the MT2 device of FIG. 1 showing the CHAP packet relaying system of FIG. 1.

CHAP packets may be framed and re-framed in the MT2 device 14 without departing from the scope of the present invention. In this case, the unframed CHAP packets are directed to bypass any PPP state machines in the MT2 PPP stacks 68. This is employed in instances where unframing is required by an implementation to determine the type of the incoming frame.

The following discussion of an exemplary CHAP implementation in the system 10 is intended to facilitate an understanding of the present invention. In the present example, the IWF 22 periodically authenticates the MT2 device 14 or the user thereof. The IWF 22 and the MT2 device 14 have a shared secret, such as a password known by both the IWF and the MT2 device 14. The IWF 22 maintains a different shared secret for different MT2 devices and categorizes the shared secrets by the identification numbers (or user names) associated with the MT2 devices. The IWF periodically sends a CHAP challenge to the MT2 device 14 and waits for a reply. The MT2 device 14 then employs the shared secret, information from the CHAP challenge, and a predetermined hash function to generate a CHAP response. The CHAP response includes some form of user identification, such as mobile station ID or user name associated with the MT2 device 14. When the IWF 22 receives the CHAP response, the IWF employs the MT2 ID or user name to access the corresponding hash function and shared secret and then runs the hash function employing the shared secret. The result of the hash function is compared with the response received from the MT2 device 14. If the result matches the CHAP response received from the MT2 device 14, then the MT2 device 14 is considered authentic.

Unfortunately, authenticating the MT2 device 14 while not authenticating the TE2 device is often undesirable. For example, a stolen MT2 device 14 may be connected to a laptop 12 and used to steal services associated with the MT2 device 14. Furthermore, implementing CHAP in the MT2 device 14 may require provisioning the MT2 device 14 with a user name and shared secret. This may require additional memory and software functionality to encode and store the shared secret and user name, which may undesirably increase the cost and size of the MT2 device 14. Alternatively, a user may enter the shared secret via a user interface, such as a keyboard or audio input device. However, this requires that the user remember the shared secret and user name and requires additional expensive user interface functionality.

It is often desirable to authenticate the TE2 device 12, since the TE2 device 12 may include functionality, such as browser functionality, not included in the MT2 device 14, which is required to access services for which authentication is required. However, employing CHAP on the MT2 device 14 to authenticate the TE2 device is inefficient, redundant, and impractical in many applications.

By providing an unobvious alteration to CHAP handling functionality on the MT2 device 14, the preferred embodiment of the present invention overcomes the shortcomings associated with the previous example as discussed more fully below. Rather than including CHAP in the $PPP_{MT2}$ stacks in the MT2 device 14, CHAP is included on the $PPP_{TE2}$ stack of the TE2 device 12. CHAP packets, such as CHAP challenges received by the MT2 device 14 from the IWF 22 are relayed by the CHAP packet relaying system 16 of the MT2 device 14 to the TE2 device 12. Similarly, CHAP packets received by the MT2 device 14 from the TE2 device 12 are relayed by the CHAP packet relaying system 16 to the IWF 22. Hence, CHAP authentication is performed directly between the IWF 22 (authenticator) and the TE2 device 12 (peer), thereby bypassing $PPP_{MT2}$ stacks and associated additional Network Model processing on the MT2 device 14. Those skilled in the art will appreciate that some form of Network Model processing may be employed in the MT2 device 14 to determine packet type without departing from the scope of the present invention.

The preferred embodiment of the present invention passes any CHAP messages strait through the MT2 device 14 without processing the CHAP messages in the $PPP_{MT2}$ of the MT2 device 14. Hence CHAP works, as designed, between the user (associated with the TE2 device 12) and authenticator (IWF 22) with no intermediary (MT2 device 14).

A PPP peer should be able to respond to a CHAP challenge during any stage of PPP. If a $PPP_{Rm}$ link is established on the $R_m$ interface, and the MT2 device 14 is handed of to a new IWF (not shown), CHAP on the TE2 device 12 negotiates the new $PPP_{Um}$ link between the TE2 device 12 and the IWF 22. This provides network model functionality without requiring CHAP support in the MT2 device 14. This also obviates provisioning the MT2 device 14 with the shared secret and user name.

The present invention can include additional functionality running on a controller in the MT2 device 14 (as discussed more fully below) to accommodate problematic IWF 22 name changes. The additional functionality changes the name field associated with CHAP challenges received from the IWF 22 to a constant that remains the same across all IWF 22's before relaying the CHAP challenge to the TE2 device 12. Some rare situations may necessitate changing the name field in a CHAP packet (via the additional functionality described above) in a CHAP response from the IWF 22 when the TE2 device 12 attempts to authenticate the IWF 22. As the CHAP challenge is passing through the MT2 device 14, it is possible for the MT2 device 14 to change the name field in the challenge message to a value that remains the same for all IWF's. This requires recalculating the cyclic redundancy check bit (CRC) at the end of the packet. If the CHAP implementation on the TE2 device 12 balks at receiving a CHAP challenge from a different host than previous challenges, this functionality provides a solution. Those skilled in the art will appreciate that the additional functionality may be implemented by one skilled in the art with access to the present teachings.

In the present embodiment, the $R_m$ link employs the RS-232 protocol. Protocols other than RS-232 may be employed for the $R_m$ link, such as Universal Serial Bus (USB) and Bluetooth protocols without departing from the scope of the present invention. Similarly, protocols in addition to or other than PPP may be employed on the $U_m$ link without departing from the scope of the present invention. In these cases, CHAP packets or other authentication protocol packets are still relayed to the TE2 device 12 via the CHAP packet relaying system 16 in the MT2 device 14, which may be implemented by one skilled in the art with access to the present teachings.

The USB protocol is described in UNIVERSAL SERIAL BUS SPECIFICATION, REVISION 1.1, published in September 1998. Bluetooth is described in BLUETOOTH SPECIFICATION VERSION 1.0A CORE, published in July 1999.

IS-99 industry standards are also employed for communications between the TE2 device 12 and the IWF 22 via the $R_m$, $U_m$, and L interfaces. QNC facilitates circuit switched call origination by the MT2 device 14. A circuit switched call is a type of packet call. The link between the packet IWF 22 and the Internet 24 may be implemented via standard connections, such as high-speed serial, T1, T3, or perhaps frame relay connections.

Figure 2:
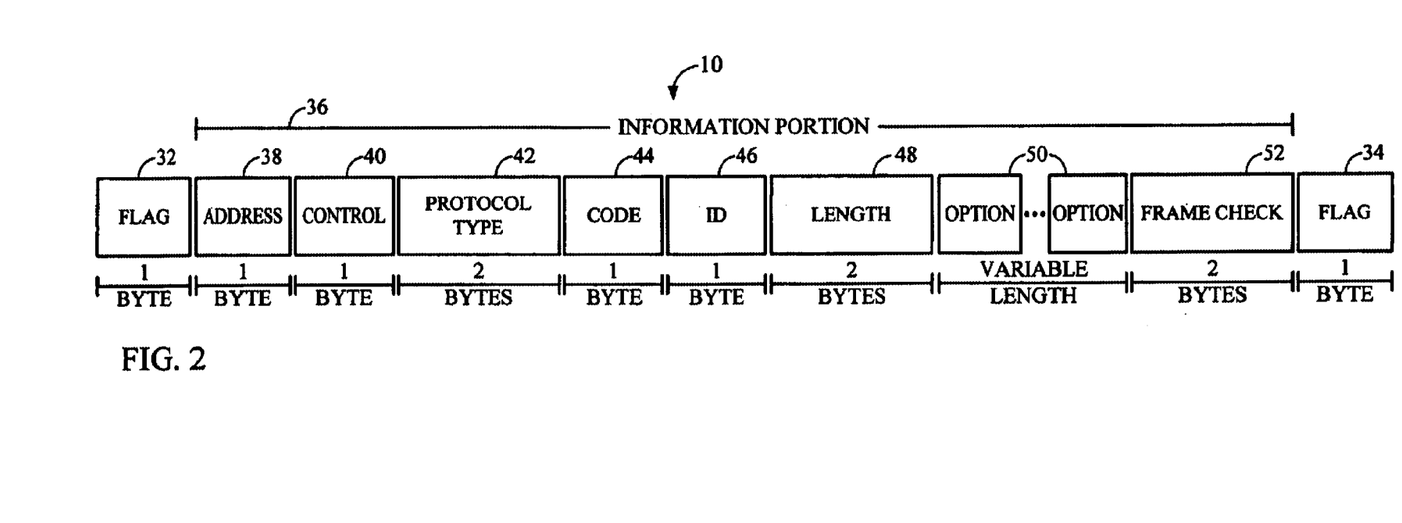
FIG. 2 is a diagram of a conventional PPP packet encapsulated in a standard HDLC frame.

FIG. 2 is a diagram of a conventional PPP frame 30. The PPP frame 30 includes a 1-byte frame delimiter flag 32 followed by a variable length information section 36 followed by another frame delimiter flag 34. The information section 36 includes, from left to right, a 1-byte address field 38, a 1-byte control field 40, a 2-byte protocol-type field 42, a 1-byte code field 44, a 1-byte identification field 46, a 2-byte length field 48, a variable length option field 50, and a 2-byte frame check field 52. Fields 38, 40,42 and 52 are part of PPP framing, while fields 44, 46, 48 and 50 are part of the PPP protocols, such as LCP and CHAP.

The protocol type field 42 specifies the type of information packet associated with the frame 30. The protocol type field 42 is employed by the CHAP packet relaying system (see 16 of FIG. 1) of the present invention, as discussed more fully below, to determine if the information packet associated with the current frame 30 is a PPP configuration packet, a CHAP packet, or another type of PPP packet. Examples of PPP configuration packets are Link Control Protocol (LCP) packets and an Internet Protocol Control Protocol (IPCP) packets. PPP configuration packets typically include configuration messages, such as Configure-Request, Configure-Ack, and Configure-Nak messages. The code field 44 indicates the type of the current message, such as a Configure-Request message.

FIG. 3 is a more detailed diagram of the MT2 device 14 of FIG. 1 showing the CHAP packet relaying system 16 constructed in accordance with the teachings of the present invention. The CHAP packet relaying system 16 includes a reverse link $R_m$ interface packet relaying system 60 and a reverse link $U_m$ interface packet relaying system 62.

For clarity, various components have been omitted from FIG. 3, such as amplifiers, clocks, antennas, mixers, down converters, display screens, microphones, speakers, and so on. However, one skilled in the art with access to the present teachings will know where and how to implement the additional requisite components without undue experimentation.

The MT2 device 14 includes an $R_m$ interface transceiver 64 for transmitting signals from the MT2 device 14 and receiving signals to the MT2 device across the $R_m$ interface. A first input of the $R_m$ interface transceiver 64 is connected to an output of an $R_m$ interface framer 66, an input of which is connected to MT2 PPP stacks 68. The MT2 PPP stacks 68 may include one or more processors and/or state machines to implement the PPP stacks. Conventional PPP stacks may be easily adapted for use with the present invention by one ordinarily skilled in the art with access to the present teachings.

A second input of the $R_m$ interface transceiver 64 is connected to an output of the reverse link $U_m$ interface packet relaying system 62. An output the $R_m$ interface transceiver 64 is connected to the $R_m$ interface packet relaying system 60. A first output of the $R_m$ interface transceiver 64 is connected to a first input of a $U_m$ interface transceiver 70. A second input of the $U_m$ interface transceiver 70 is connected to an output of a $U_m$ interface framer 72, an input of which is connected to an output of the MT2 PPP stacks 68. An output of the $U_m$ interface transceiver 70 is connected to an input of the reverse link $U_m$ interface packet relaying system 62. An output of the $U_m$ interface packet relaying system 62 is connected to a $U_m$ interface unframer 74, an output of which is connected to an input of the MT2 PPP stacks 68. Another input of the MT2 PPP stacks 68 is connected to an output of a $R_m$ interface unframer 76, an input of which is connected to an output of the $R_m$ interface packet relaying system 60. An MT2 controller and user interface 78 is connected to the MT2 PPP stacks 68. The MT2 controller and user interface 78 facilitates updating or editing MT2 protocol stacks 68.

In operation, PPP links are established over the $R_m$ and $U_m$ interfaces as discussed above. PPP frames received by the MT2 device 14 via the $R_m$ interface are sent to the $R_m$ interface packet relaying system 16. The $R_m$ interface packet relaying system 16 analyzes each received frame to determine whether the frame should be relayed directly to the $U_m$ interface via the $U_m$ interface transceiver 70 or unframed by the $R_m$ interface unframer 76 and processed by the MT2 PPP stacks 68 before being reframed by the $U_m$ interface framer 72 and transmitted over the $U_m$ interface via the $U_m$ interface transceiver 70. In the present embodiment, the $R_m$ interface packet relaying system 60 analyzes a certain number of bytes from each incoming frame by first unescaping the bytes to determine the type of packet associated with the current received frame, as discussed more fully below. Systems and methods for unescaping bytes are known in the art.

If the current receive frame is associated with a CHAP packet or message then the frame is relayed or forwarded to the $U_m$ interface transceiver 70 in preparation for transmission over the $U_m$ interface. If the current received frame is associated with a PPP configuration packet, such as an LCP or an IPCP packet, the frame is sent to the $R_m$ interface unframer 76 in preparation for processing by the MT2 PPP protocol stacks 68. Generally, select PPP packets that are not PPP configuration packets and do not require Network Model processing via the MT2 PPP protocol stacks 68 are relayed to the $U_m$ interface transceiver 70 in preparation for transmission over the $U_m$ interface. Hence, CHAP packets and select PPP packets other than PPP configuration packets are selectively relayed to the $U_m$ interface transceiver 70, thereby bypassing additional processing via the $R_m$ interface unframer 76, the MT2 PPP stacks 68, and the $U_m$ interface framer 72.

Similarly, CHAP packets received over the $U_m$ interface by the $U_m$ Interface transceiver 70 and the $U_m$ interface packet relaying system 62 are relayed to the $R_m$ interface transceiver 64 in preparation for transmission over the $R_m$ interface, thereby bypassing additional processing via the $U_m$ interface unframer 74, the MT2 PPP stacks 68, and the $R_m$ interface framer 66. By selectively passing CHAP packets and select PPP packets other than PPP configuration packets through the MT2 device 14 via the packet relaying system 16, 60, and 62, the present invention avoids unnecessary processing of packets. Furthermore, the TE2 device 12 is authenticated via CHAP rather than MT2 device 14, which is desirable for aforementioned reasons.

Alternatively, the $R_m$ interface packet relaying system 60 may be altered and repositioned after the $R_m$ interface unframer 76 so that the $R_m$ interface packet relaying system 60 receives unframed packets as input. Similarly, the $U_m$ interface packet relaying system 62 may be altered and repositioned after the $U_m$ interface unframer 74 so that the $U_m$ interface packet relaying system 62 receives unframed packets as input. In these cases, the packet relaying systems 60 and 62 are altered to determine the type of incoming packet by analyzing the protocol type fields (see 42 of FIG. 2) of received unframed packets rather than received framed packets. This alteration may be done by one skilled in the art will access to the present teachings.

In the present specific embodiment, the $R_m$ interface transceiver 64 is constructed in accordance with EIA-232 Electronics Industry Association standards. The $U_m$ interface transceiver 70 is constructed in accordance with IS-95 Telecommunications Industry Association standards. Those skilled in the art will appreciate that while the present embodiment is adapted for use with PPP, the packet relaying systems 60 and 62 may be altered by one skilled in the art with access to the present teachings to accommodate a different protocol to meet the needs of a given application without departing from the scope of the present invention.

Figure 4:
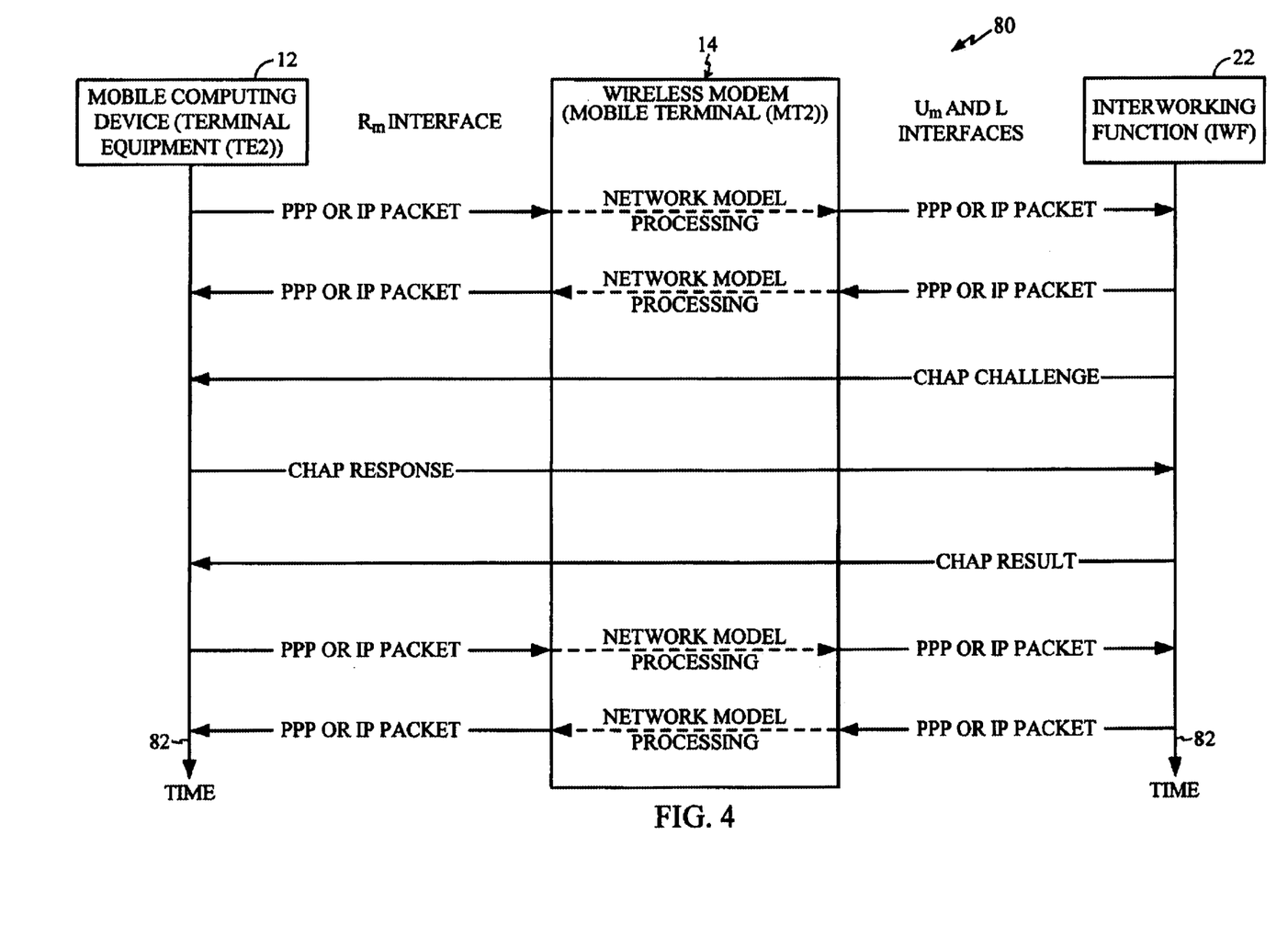
FIG. 4 is a message flow diagram illustrating the operation of the CHAP packet relaying system of FIGS. 1 and 3.

FIG. 4 is a message flow diagram 80 illustrating the operation of the CHAP packet relaying system 16 of FIGS. 1 and 3. The message flow diagram 80 illustrates an exemplary message sequence between the IWF 22, the MT2 device 14, and the TE2 device 12 over the $U_m$, L, and $R_m$ interfaces, which takes place over time, which is represented by the time axis 82. PPP or IP packets received by the MT2 device 14 from the TE2 device 12 or the IWF 22 are processed in the MT2 device 14 in accordance with the IS-707 Network Model. However, CHAP packets are passed through the MT2 device 14 and bypass Network Model processing in the MT2 device 14.

CHAP may be substituted with another type of authentication protocol without departing from the scope of the present invention. In such cases, packets of the different authentication are also passed through the MT2 device 14 and bypass Network Model processing in the MT2 device 14.

In the preferred embodiment, packets other than CHAP packets, such as select PPP packets that are not PPP configuration packets, are also passed through the MT2 device 14, thereby bypassing Network Model processing in the MT2 device 14 and improving the efficiency of the communications links between the TE2 device 12 and the IWF 22.

Figure 5:
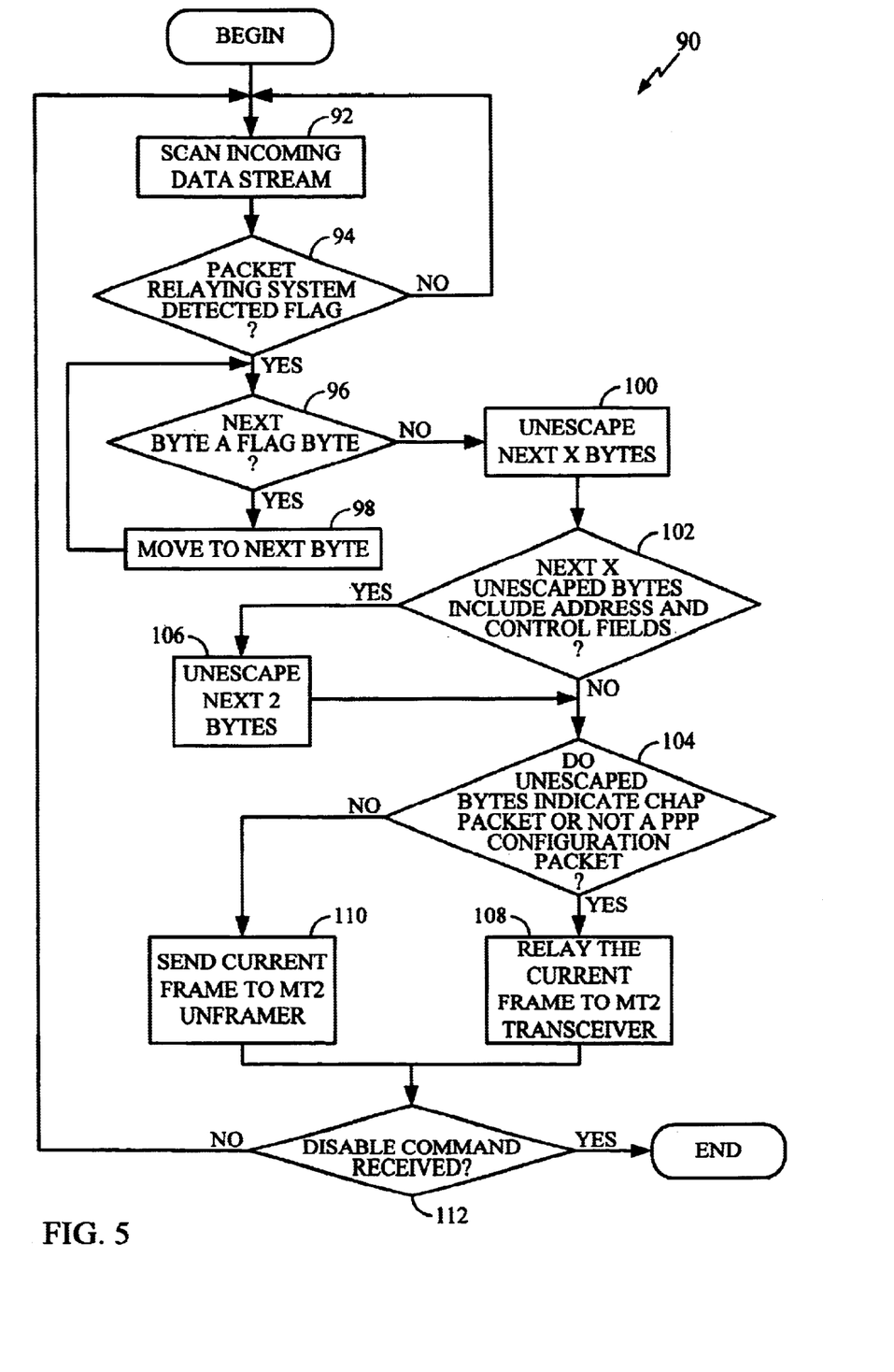
FIG. 5 is a flow diagram of software employed by the communications system of FIG. 1 to facilitate efficient, private, and secure communications between the TE2 device and the IWF of FIG. 1 via the CHAP packet relaying system of FIGS. 1 and 3.

FIG. 5 is a flow diagram of exemplary software 90 adapted for use with the communications system 10 of FIG. 1 to facilitate efficient, private, and secure communications between the TE2 device 12 and the IWF 22 of FIG. 1 via the CHAP packet relaying system 16, 60, 62 of FIGS. 1 and 3. With reference to FIGS. 1, 2, and 3, the software 90 runs on the $R_m$ interface packet relaying system 60 and the $U_m$ interface packet relaying system 62 of FIG. 3. The relaying systems 60 and 62 may be selectively enabled and disabled via enable inputs (not shown) from the MT2 controller 78 of FIG. 3. When disabled, the relaying systems 60 and 62 of the system 16 pass incoming data through to the $R_m$ interface unframer 76 and to the $U_m$ interface unframer 74, respectively. It is also possible that the PPP packet be unframed, and by examining the protocol type field 42, a determination is made whether to forward the packet to the $PPP_{MT2}$ stacks 68, or if it should be forwarded directly to the framer, thus bypassing the $PPP_{MT2}$ stacks 68.

In an initial scanning step, the CHAP packet relaying system 16 scans the incoming data stream from the $R_m$ interface transceiver 64 and the $U_m$ interface transceiver 70 for flags. Subsequently, control is passed to a flag-checking step 94.

The flag-checking step 94 determines if a frame flag (See 32 and 34 of FIG. 2.) was detected in the scanning step 92. If a frame flag was not detected, control is passed back to the scanning step 92. Otherwise, control is passed to a first byte-checking step 96.

The first byte-checking step 96 determines if the subsequent received byte is associated with a frame flag. If the next byte is associated with a frame flag, control is passed back to the byte-checking step 96, which checks the subsequent byte. If the next byte is not associated with a frame flag, control is passed to a first unescaping step 100 where predetermined number (X) of subsequent bytes are unescaped. Subsequently, control is passed to a second byte-checking step 102.

The second byte-checking step 102 determines if the X unescaped bytes include bytes associated with address and control fields (See 38 and 40 of FIG. 2.). If the X unescaped bytes do not contain address and control fields, control is passed to a packet type-checking step 104. Otherwise, control is passed to a second unescaping step 106, where the next two bytes are unescaped, and control is then passed to the protocol-checking step 104.

The protocol-checking step 104 determines if the current frame represents a CHAP packet or a PPP packet other than a PPP configuration packet. If the unescaped bytes indicate that the current frame is associated with a CHAP packet or a PPP packet that is not a PPP configuration packet, then control is passed to a relaying step 108, where the current frame is relayed to the MT2 transceiver 64 or 70. If the unescaped bytes do not indicate that the current frame is associated with a CHAP packet and/or indicate that the packet is a PPP configuration packet, control is passed to an unframing step 110, where the current frame is sent to the MT2 unframer 74 or 76. Subsequently, control is passed to a disable-checking step 112.

The disable-checking step 112 determines if a disable command was received from the MT2 controller 78. If a disable command was received, the software 90 ends and may be restarted with an enable command. Otherwise, control is passed back to the scanning step 92.

Software and methods other that described above for the software 90 may be employed to determine the type of incoming packet, i.e., CHAP or PPP configuration packet, without departing from the scope of the present invention.

Additional methods for determining the type of protocol packet that is associated with a received PPP frame are disclosed in co-pending U.S. patent application Ser. No. 09/392,342, filed Sep. 8, 1999, by QUALCOMM INC., entitled METHODS FOR EFFICIENT EARLY PROTOCOL DETECTION, (Atty. Docket No. 990035), assigned to the assignee of the present invention and incorporated herein by reference. Additional methods for selectively framing and unframing PPP packets are disclosed in co-pending U.S. patent application Ser. No. 09/353,109, filed Jul. 14, 1999, by QUALCOMM Incorporated, entitled SELECTIVELY FRAMING AND UNFRAMING PPP PAKCETS DEPENDING ON NEGOTIATED OPTIONS ON THE UM AND RM INTERFACES, (Atty. Docket No. QCPA 863), assigned to the assignee of the present invention and incorporated herein by reference.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for efficiently accommodating an authentication protocol in a communications system comprising:

first means for establishing a first communications interface between a first device and a second device and for establishing a second communications interface between said second device and a third device;

second means for selectively relaying authentication signals received by said second device between said first device and said third device, the second means including a first interface packet relaying system for receiving data packets from the first communication interface and a second interface packet relaying system for receiving data packets from the second communications interface, the first and second interface packet relaying systems determining whether a received data packet is an authentication packet or a configuration packet; and third means in communication with said third device and said second means for authenticating said first device via a first communications link and a second communications link, wherein the second means transmits the received data packet determined to be an authentication packet to the first communication interface or to the second communication interface without performing network model processing on the authentication packet.

2. The system of claim 1 wherein said third means further includes fourth means for selectively processing configuration signals received by said second device via said second interface.

3. The system of claim 2 wherein said first interface and said second interface are point-to-point protocol (PPP) interfaces.

4. The system of claim 3 wherein said first interface is a $U_m$ interface and said second interface is an $R_m$ interface.

5. The system of claim 3 wherein said second means includes an authentication protocol.

6. The system of claim 5 wherein said authentication protocol includes Challenge Handshake Authentication Protocol (CHAP).

7. The system of claim 1, the second means does not unframe and reframe authentication packets.

8. The system of claim 7 wherein said wireless communications system is a Code Division Multiple Access (CDMA) communications system.

9. The system of claim 8 wherein said first device includes a TE2 device and said second device includes an MT2 device.

10. The system of claim 9 wherein said third device includes a base station, a Base Station Transceiver Subsystem (BTS), or a Mobile Switching Center (MSC) in communication with an Interworking Function (IWF).

11. The system of claim 10 wherein said $U_m$ interface includes a wireless interface between said MT2 device and a base station, a base station transceiver subsystem, or a mobile switching center of said wireless communications system.

12. The system of claim 11 wherein said MT2 device includes a wireless phone and said TE2 device includes a computer.

13. The system of claim 12 wherein said TE2 device is a mobile computing device.

14. The system of claim 1 wherein said first means includes a Point-to-Point Protocol (PPP) stack on said second device.

15. The system of claim 14 wherein the authentication packets are Challenge Handshake Authentication Protocol (CHAP) packets.

16. A system for efficiently accommodating an authentication protocol in a wireless communication system comprising:

an Interworking Function (IWF) in communication with wireless network infrastructure;

a mobile station including a wireless modem and an accompanying electronic device adapted for data network access, said mobile station, said IWF and associated network infrastructure adapted for use with Point-to-Point Protocol (PPP);

an authentication protocol installed on said IWF and said electronic device; and an authentication protocol packet relaying system associated with said wireless modem that selectively relays received authentication protocol packets provided via said authentication protocol between said IWF and said electronic device, wherein the authentication protocol packet relaying system relays the authentication protocol packets without performing network model processing on the authentication protocol packet.

17. The system of claim 16 wherein said wireless communications system is a Code Division Multiple Access wireless communications system.

18. The system of claim 17 wherein said authentication protocol includes Challenge Handshake Authentication Protocol (CHAP).

19. The system of claim 18 wherein said IWF is connected to the Internet.

20. The system of claim 16 wherein said electronic device is a computer.

21. The system of claim 16 wherein said wireless network infrastructure includes one or more Mobile Switching Centers (MSC's) and one or more base stations or Base Station Transceiver Subsystems (BTS's).

22. A method for efficiently accommodating an authentication protocol in a communications system comprising the steps of:

establishing a first communications interface between a first device and a second device and for establishing a second communications interface between said second device and a third device;

determining whether a data packet received from the first device or the second device is an authentication packet or a configuration packet;

transmitting the received data packet determined to be an authentication packet to the first or the second device without performing network model processing; and transmitting the received data packet determined to be a configuration packet to the first or the second device after performing network model processing.

* * * * *

UNITED STATES PATENT AND TRADEMARK OFFICE
CERTIFICATE OF CORRECTION

PATENT NO.    : 6,721,555 B1
DATED         : April 13, 2004
INVENTOR(S)   : Marc S. Phillips, Marcello Lioy and Raymond Tah-Sheng Hsu It is certified that error appears in the above-identified patent and that said Letters Patent is hereby corrected as shown below:

<u>Title page,</u>
Item [75], Inventors, please correct the spelling of inventor "Raymond Tah-Shen Hsu" to reflect the following: -- Raymond Tah-Sheng Hsu --.

Signed and Sealed this

Seventh Day of September, 2004

JON W. DUDAS
*Director of the United States Patent and Trademark Office*